(12) United States Patent
Cantrill

(10) Patent No.: US 7,395,528 B1
(45) Date of Patent: Jul. 1, 2008

(54) MECHANISM FOR TRACING DURING BOOT

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 755 days.

(21) Appl. No.: 10/713,410

(22) Filed: Nov. 14, 2003

(51) Int. Cl.
*G06F 9/44* (2006.01)

(52) U.S. Cl. .................. 717/128; 717/130; 717/131

(58) Field of Classification Search .......... 717/124–135
See application file for complete search history.

(56) References Cited

OTHER PUBLICATIONS

Tamches, "Fine-Grained Dynamic Instrumentation of Commodity Operating System Kernels", University of Wisconsin, pp. 1-141, 2001.*

Uhlig et al., "Trace-Driven Memory Simulation: A Survey", ACM, pp. 128-169, Jun. 1997.*

Tamches, Ariel and Miller, Barton P; Fine-Grained Dynamic Instrumentation of Commodity Operating System Kernels; [Online]; http://www.usenix.org/publications/library/proceedings/osdi99/full_papers/tamches/tamches.pdf, Published Feb. 1999.

Murayama, John; "Performance Profiling Using TNF"; [Online]; http://developers.sun.com/solaris/articles/tnf.html, Jul. 2001.

Lorch, Jacob R. and Smith, Alan J.; "The Vtrace Tool: Building a system Tracer for Windows NT and Windows 2000"; [Online] http://msdn.microsoft.com/msdnmag/issues/1000/Vtrace/default.aspx, Oct. 2000.

"Chapter 10. The Generalized Trace Facility (GTF)"; [Online]; http://publib.boulder.ibm.com/cgi-bin/bookmgr/BOOKS/IEA2V100/CCONTENTS, Jan. 2001.

Mirgorodskii, Alex; "The Path to Portable Kernel Instrumentation: The Kernist API"; http://www.dyninst.org/mtg2003/slides/KerninstAPI.pdf, Apr. 2003.

Richard Moore, et al.; "IBM Dynamic Probes"; http://www-124.ibm.com/developerworks/opensource/linux/projects/dprobes/README, 2000.

K. Yaghmour et al.; "Measuring and Characterizing System Behavior Using Kernel-Level Event Logging"; Proceedings of the 2000 USENIX Annual Technical Conference; Jun. 18-23, 2000, San Diego, California, USA.

* cited by examiner

*Primary Examiner*—Ted T Vo
(74) *Attorney, Agent, or Firm*—Osha Liang LLP

(57) ABSTRACT

A method for tracing an instrumented program on a system during booting, including loading object code defining enabling information into a property file associated with a tracing framework, rebooting the system, processing the property file to enable the tracing framework, wherein enabling the tracing framework comprises creating an anonymous consumer state, and tracing the instrumented program using the enabled tracing framework.

25 Claims, 5 Drawing Sheets

MECHANISM FOR TRACING DURING BOOT

BACKGROUND

Analyzing the dynamic behavior and performance of a complex software system is difficult. Typically, analysis of a software system is achieved by gathering data at each system call and post-processing the data. The following is a brief description of conventional tracing frameworks.

Conventional tracing frameworks are typically composed of various independent software modules. The primary source of information accessed by the conventional tracing frameworks is the kernel. The conventional tracing frameworks typically include a trace facility, a trace module, a daemon, and an offline data analysis and processing component. The trace facility gathers information from various components of the kernel and forwards events to the trace module. The trace module subsequently logs the events in its buffer. Periodically, the trace daemon reads the events from the trace module buffer and commits the recorded events into a user-provided file.

The trace facility is an extension to the core kernel facilities. The trace facility provides a unique entry point to all of the other kernel facilities requesting or requiring that an event be traced. Such events are not logged, but instead, the trace request is forwarded to the trace module. If the trace module is compiled as part of the kernel, then the trace module achieves this functionality by registering itself with the trace facility upon system startup. Otherwise, if the trace module is compiled and loaded as a separate module, then the registration takes place when the trace module is loaded.

During the registration process, the trace module provides the trace facility with a call-back function that is called whenever an event occurs. If no trace module is registered, then the traced events are ignored. Furthermore, the registration process provides the trace module with the ability to configure the manner in which the instruction pointer values are recorded upon the occurrence of a system call. Once configured, the kernel browses the stack to find an instruction pointer matching the desired constraints whenever a system call occurs. In summary, the kernel trace facility acts as a link between the trace module and the different kernel facilities.

The trace module stores the incoming event descriptions and delivers them efficiently to the daemon. More specifically, the trace module retrieves additional information for each event occurring in the kernel. This additional information includes the time at which the event occurred and the CPU identifier for the event.

The primary function of the daemon is to retrieve and store the information accumulated by the trace module, typically in a file. The daemon provides the user with a number of options to control the tracing process. In addition to giving the user access to the options available from the trace module, the daemon allows the user to specify the tracing duration. Once the daemon is launched, the daemon opens and configures the trace module, and sets a timer if a time duration was specified. Otherwise, the user terminates the daemon process manually to stop the trace.

During normal operation, the daemon typically sleeps, awaiting a signal to read from the trace module, or timer/terminate events to end tracing. Similar to the trace module, the daemon uses double buffering. When the daemon receives a signal from the trace module, the daemon reads the content of the buffer denoted as the read buffer and appends the content to the content in an associated internal buffer (not shown). Once the internal buffer is full, the contents of the internal buffer is committed to a file and, during this process, a second internal buffer is used to record the incoming data.

To enable processing of the event data, conventional tracing frameworks typically require the state information for the software system state prior to performing the trace. Specifically, the daemon reviews one or more system directories and records the following characteristics for each process: 1) process ID; 2) name; and 3) parent's process ID. The state information is typically retrieved after the configuration of the trace module and prior to the start of the trace. The information retrieved is stored in a file that is later used by the analysis software. Unlike the aforementioned components of the conventional tracing framework described above, the data analysis and presentation software is typically run off-line. The software uses both the initial process state and the trace data files created by the daemon to recreate the dynamic behavior of the system in a particular, observed time interval. Collating and sorting utilities with the software are used to display the stored information at the user-level.

Typically, kernel-level tracing frameworks, such as the one described above, are directed by a user-level program. That is, a user-level program communicates to the kernel-level tracing framework when tracing should be started, what should be traced, how tracing should be enabled, etc. Thus, to perform a tracing activity the system must be booted (or least be running programs) prior to initiating any tracing activity directed by the user-level program.

SUMMARY

In general, in one aspect, the invention relates to a method for tracing an instrumented program on a system during booting, comprising loading object code defining enabling information into a property file associated with a tracing framework, rebooting the system, processing the property file to enable the tracing framework, wherein enabling the tracing framework comprises creating an anonymous consumer state, and tracing the instrumented program using the enabled tracing framework.

In general, in one aspect, the invention relates to an apparatus for tracing an instrumented program on a system during booting, comprising a tracing framework configured to support an anonymous consumer state and configured to trace the instrumented program using the anonymous consumer state, and a property file configured to store an object code defining enabling information to create the anonymous consumer state.

In general, in one aspect, the invention relates to a network system having a plurality of nodes, comprising a tracing framework configured to support an anonymous consumer state and configured to trace the instrumented program using the anonymous consumer state, and a property file configured to store an object code defining enabling information to create the anonymous consumer state, wherein the tracing framework resides on any one of the plurality of nodes, and wherein the property file resides on any one of the plurality of nodes.

In general, in one aspect, the invention relates to a computer system configured to tracing an instrumented program on a system during booting, comprising a first processor, a memory, a storage device, and software instructions stored in the memory for enabling the computer system to load object code defining enabling information into a property file associated with a tracing framework, reboot the system, process the property file to enable the tracing framework, wherein enabling the tracing framework comprises creating an anonymous consumer state, and trace the instrumented program using the enabled tracing framework.

Other aspects of the invention will be apparent from the following description and the appended claims.

DETAILED DESCRIPTION

Figure 1:
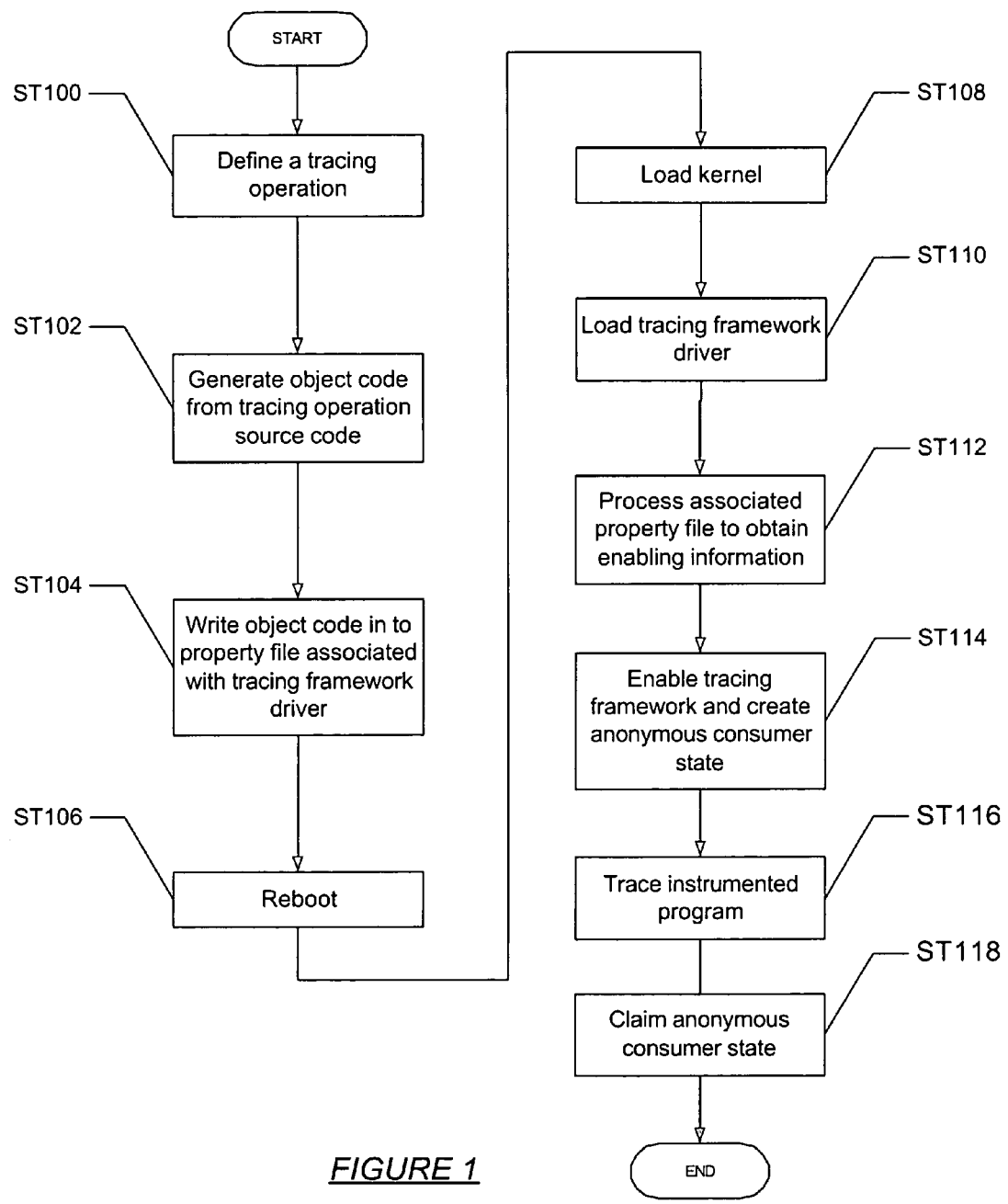
FIG. 1 shows a flowchart in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method to tracing during boot. More specifically, embodiments of the invention provide a method to enable the tracing framework to trace an instrumented kernel and other programs while the system is booting prior to the system being able to execute a user-level program. Further, embodiments of the invention provide a method for removing the link between a user-level program and a kernel-level tracing framework directed by the user-level program, while still retaining the flexibility of directing tracing from the user-level program.

In one or more embodiments of the invention, one or more consumers directs tracing activities of one or more probes in an instrumented program via a tracing framework. The consumer is a user-level program that defines a tracing operation. The tracing operation defines what probes to enable and what actions the tracing framework is to perform when a given enabled probe is encountered during the execution of the instrumented program (i.e., the program which is being traced). The trace operations are subsequently compiled into object code that is then communicated to the tracing framework. In one or more embodiments of the invention, a probe corresponds to a location in the instrumented program that is configured to interact, when enabled, with the tracing framework when it is encountered by a thread executing the instrumented program.

The tracing framework uses the object code to enable various portions of the tracing framework that are required to perform the tracing functions defined by the consumer. In one embodiment of the invention, the tracing framework, in accordance with the object code, enables the specified probes with the specified actions (i.e., actions the tracing framework is to perform when the probe is encountered) and creates a consumer state to associate with the enabling.

In one or more embodiments of the invention, the consumer state provides a link between the tracing framework, and more specifically, the portions of the tracing framework that were enabled in response to the tracing operation defined by the consumer. This link allows the consumer to interact with the tracing framework. While this link is present when the system on which the tracing framework can execute user-level programs, this link is not present during the boot process (i.e., the period of time when the system is powered on to when user-level processes/program may be executed on the system). Those skilled in the art will appreciate that the boot process make take long time, running to tens or even hundreds of minutes on large multi-processors systems. Embodiments of the invention provide a method to retain the flexibility of a user-level program driven kernel-level tracing framework, while extending the kernel-level framework to be able to trace during boot. More specifically, embodiments of the invention provide a method to enable the tracing framework without using a consumer (i.e., a user-level program). Then, once a consumer can execute on the system, the control of the tracing framework may be transferred to a particular consumer.

FIG. 1 shows a flowchart in accordance with one embodiment of the invention. More specifically, FIG. 1 shows a method for tracing during boot in accordance with one embodiment of the invention. Initially, a tracing operating source code is defined (Step 100). The tracing source code is used as input into a user-level program that creates corresponding object code (Step 102). The object code includes information (i.e., enabling information) about how to enable the tracing framework to perform the tracing operation defined in the tracing operation source code. More specifically, the object code may include information about what probes to enable and what actions to perform when a particular enabled probe fires. The object code is subsequently loaded/written into a property file associated with a tracing framework driver. (Step 104). The tracing framework driver is a kernel module that includes information that is used to instantiate the tracing framework when it is initially loaded by the system during boot. In general, the property file defines additional properties that are required/used by the tracing framework driver. In this particular embodiment, the property file includes information about how to enable the tracing framework.

Those skilled in the art will appreciate that the mechanism for loading object code into the property file and associating the property file is specific to the system architecture upon which the invention is implemented.

Figure 2:
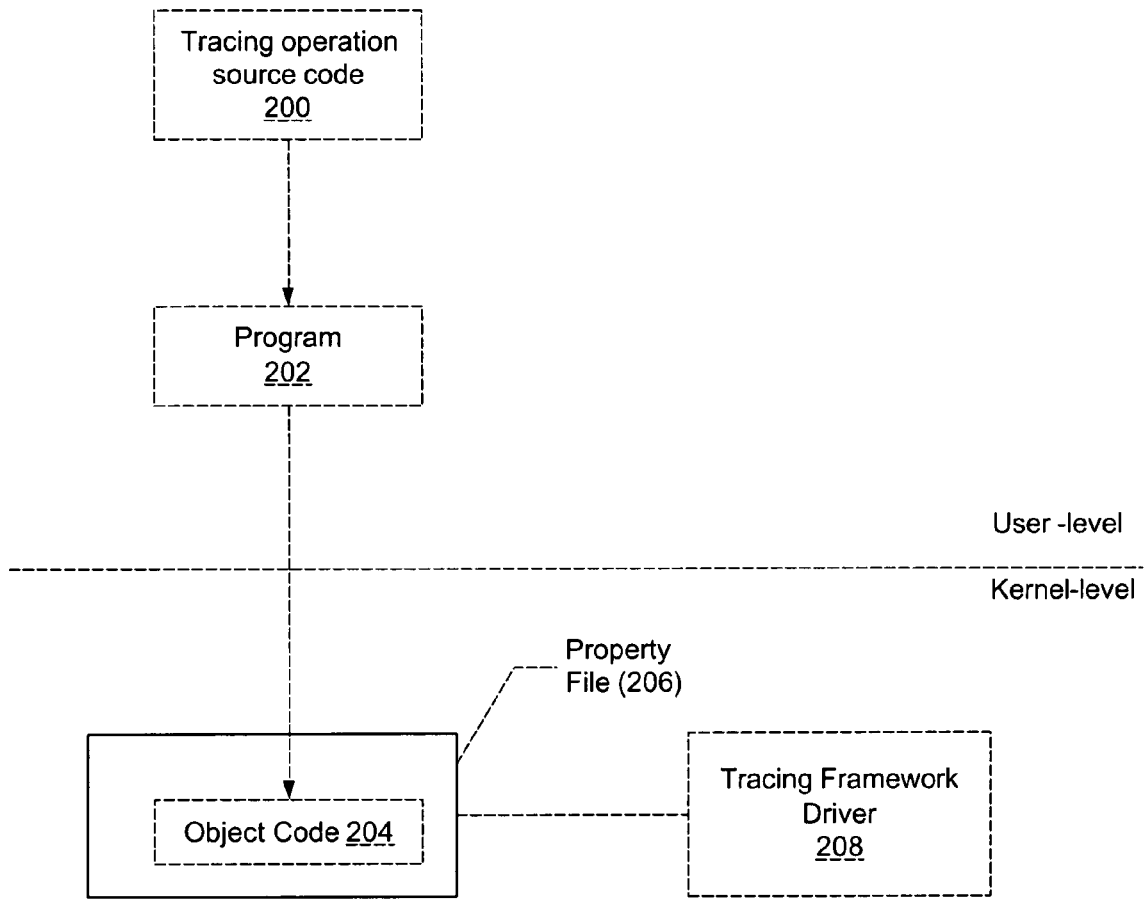
FIG. 2 shows a flow diagram in accordance with one embodiment of the invention.

FIG. 2 shows a flow diagram in accordance with one embodiment of the invention. More specifically, FIG. 2 shows the relationship and relative location of the aforementioned components as described in Steps 100 through 104 of FIG. 1 above. Specifically, the tracing operation source code (200) is defined in the user-level and forwarded to a user-level program (202). The program, as mentioned above, includes the necessary functionality to analyze the tracing operation source code (200) and generate corresponding object code (204). The object code is subsequently loaded/written into a property file (206) located in the kernel-level. The property file (204) is associated with a corresponding tracing framework driver (208). Note that while FIG. 2 shows a property file (206) as separate from the tracing framework driver (208), in other implementations of the invention, the property file (206) may reside inside the same data structure as the tracing framework driver (208).

Returning to FIG. 1, after the object code is loaded/written into a property file associated with a tracing framework driver, the system is rebooted (Step 108). The system subsequently loads the kernel (Step 108). After the kernel has been loaded and initialized, the kernel then loads additional kernel modules such as the tracing framework driver (Step 110). Note that the order in which additional kernel modules are loaded is specific to the particular kernel of the system in which the tracing framework is executing. However, in some instances, various options/flags/system parameters may be set to force the kernel to load a particular module, such as the tracing framework driver, as soon as possible after the kernel has been initialized during the booting/re-booting process. For example, a forceload system parameter may be used to force the Solaris™ kernel to load a particular kernel module as soon as possible after the kernel has been initialized. Solaris™ is a trademark of Sun Microsystems, California, U.S.A. The aforementioned reference to Solaris™ reference is merely included for illustrative purposes and is not intended to limit the scope of the invention.

Continuing with the discussion of FIG. 1, once the tracing framework driver has been loaded and the tracing framework has been instantiated, the property file, which includes the object code, is processed to obtain the information necessary to enable the tracing framework a defined by the tracing operation source code (Step 112). The tracing framework is subsequently enabled using the information (Step 114). Specifically, the tracing framework uses the information to enable the specified probes with the specified actions and to create an anonymous consumer state associated with the enabling. In one or more embodiments of the invention, the state of the tracing framework resulting from creating an anonymous consumer state from the object code loaded/written in the property file is the same as it would have been if a user-level program (e.g., a consumer) had defined a tracing operation and communicated it to the tracing framework during normal non-boot tracing.

Figure 3:
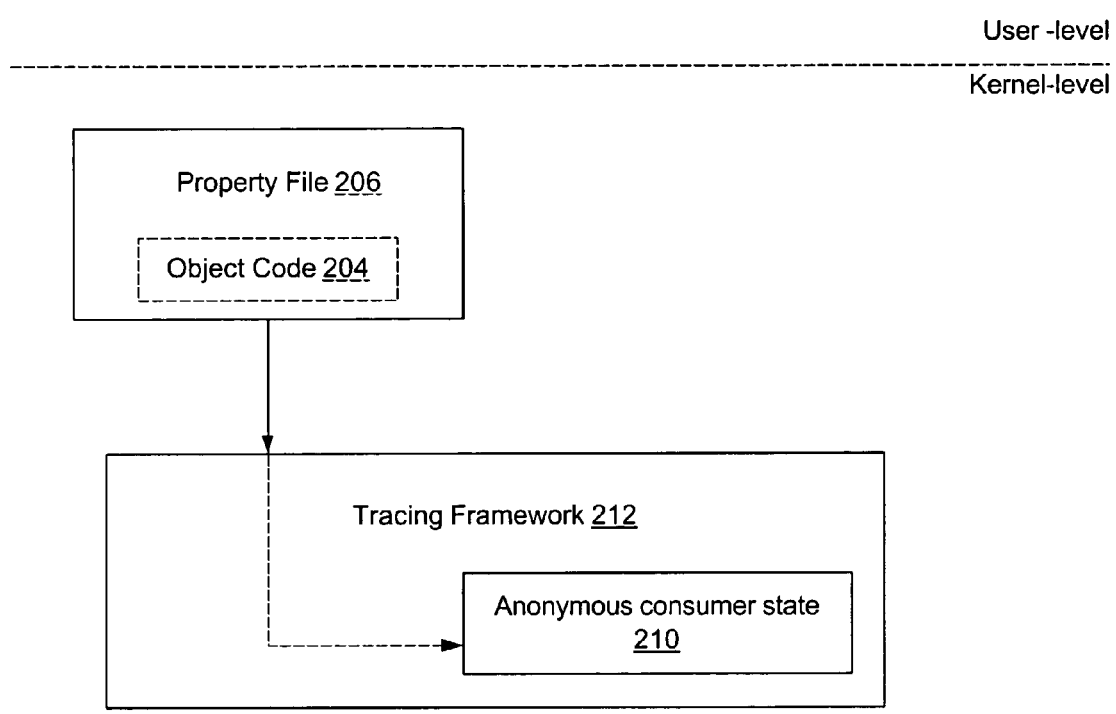
FIG. 3 shows a flow diagram in accordance with one embodiment of the invention.

FIG. 3 shows a flow diagram in accordance with one embodiment of the invention. More specifically, FIG. 3 shows the relationship and relative location of the aforementioned components as described in Steps 106 through 114. Specifically, a kernel (not shown) processes the object code (204) located in the property file (206) and uses the results to create an anonymous consumer state (210) in the tracing framework (212).

Returning to the discussion of FIG. 1, after tracing framework has been enabled, the tracing framework commences tracing the instrumented program (Step 116). At some later time, after the system has booted and user-level programs can run and direct kernel-level tracing frameworks, a consumer may call into the tracing framework and claim (i.e., become associated with) the anonymous consumer state (Step 118). After the consumer claims the anonymous state, the anonymous state becomes a consumer state that is associated with the particular consumer. The consumer may then retrieve the information obtained by the consumer state (previously the anonymous consumer state) and process the information at user-level.

In one embodiment of the invention, prior to associating the anonymous consumer state with the consumer, the information obtained during tracing that is associated with the anonymous consumer state is stored in a kernel-level data buffer.

Those skilled in the art will appreciate that the components above may reside on one system. Alternatively, the components may be distributed across a plurality of nodes (i.e., distributed processors) and communicate, for example, via a network.

Figure 4:
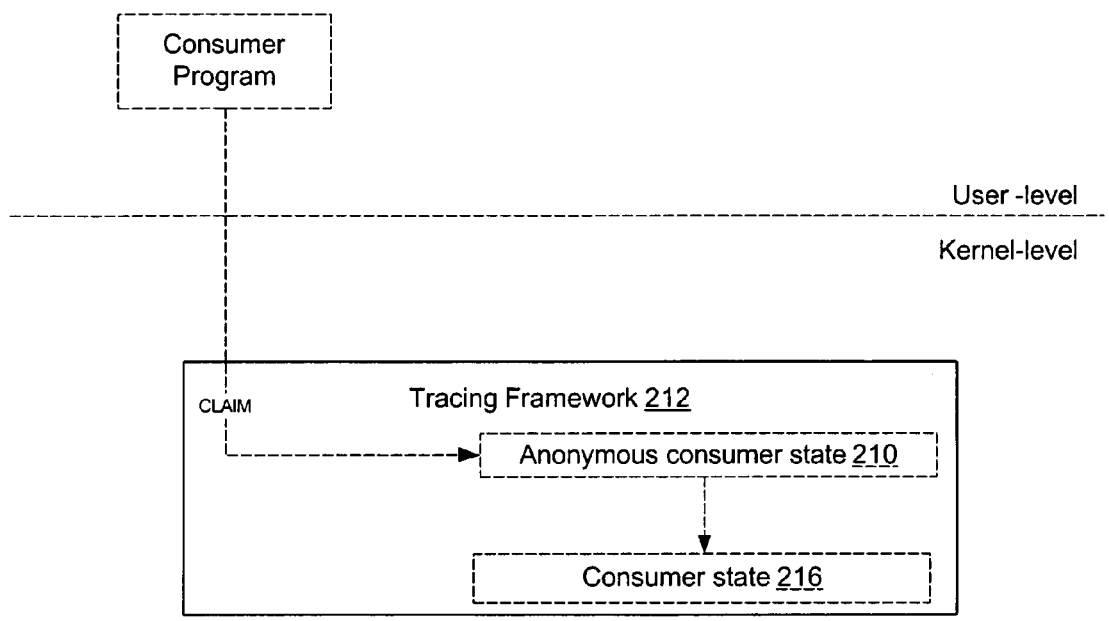
FIG. 4 shows a flow diagram in accordance with one embodiment of the invention.

FIG. 4 shows a flow diagram in accordance with one embodiment of the invention. More specifically, FIG. 4 shows the relationship and relative location of the aforementioned components as described in Steps 116 through 118. Specifically, once a user-level program such as a consumer (214) can run on the system, the consumer (214) may claim the anonymous consumer state (210) residing in the tracing framework (212). The result of claiming the anonymous consumer state (210) is to change the anonymous consumer state into a consumer state (216). The consumer (214) now associated with the consumer state (216) can then direct the tracing activities of the consumer state (216).

Figure 5:
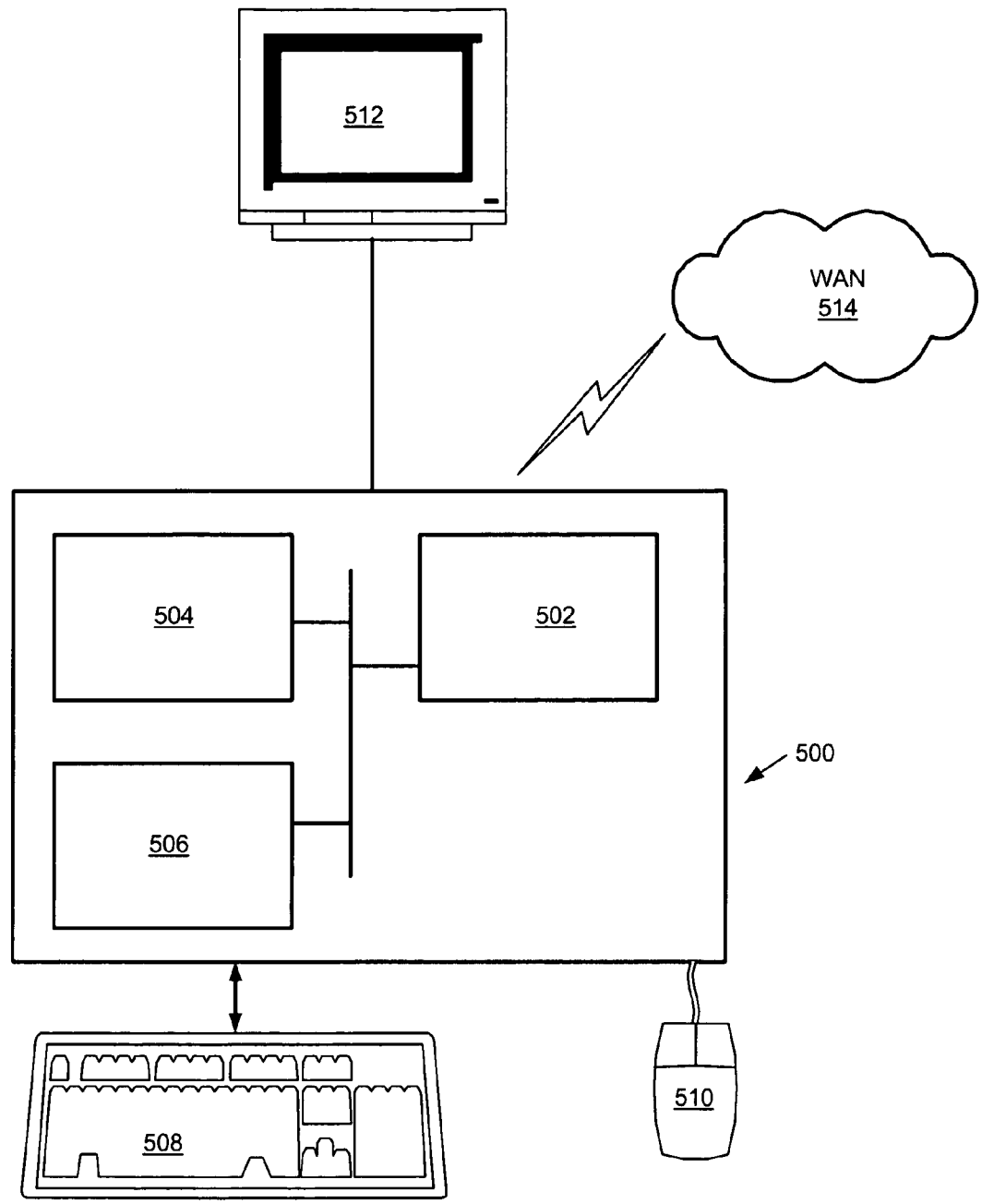
FIG. 5 shows a networked computer system in accordance with one embodiment of the invention.

The invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (514) (e.g., the Internet) via a network interface connection (not shown). Those skilled in the art will appreciate that these input and output means may take other forms. Those skilled in the art will appreciate that one or more elements of the aforementioned computer (500) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracing an instrumented program on a system, comprising:
    booting the system;
    loading, after the system has booted, object code defining enabling information into a property file associated with a tracing framework; and
    rebooting the system after loading the object code, wherein while the system is rebooting:
        the property file is processed to enable the tracing framework, wherein enabling the tracing framework comprises creating an anonymous consumer state, and
        the instrumented program is traced using the enabled tracing framework, and
    wherein the system is unable to execute a user-level program while rebooting.

2. The method of claim 1, further comprising:
    associating the anonymous consumer state with a consumer after the system has completed rebooting.

3. The method of claim 2, wherein the anonymous consumer state is converted to a consumer state after the anonymous consumer state is associated with the consumer.

4. The method of claim 3, wherein the consumer can access the information obtained during tracing associated with the anonymous consumer state, after the anonymous consumer state is associated with the consumer.

5. The method of claim 1, further comprising:
    loading a kernel into the system, wherein the kernel is configured to load the property file as soon as possible after the kernel is loaded.

6. The method of claim 1, further comprising:
    defining a tracing operation source code; and
    generating the object code using the tracing operation source code.

7. The method of claim 1, wherein the enabling information defines a probe to enable and an action to perform when the probe is encountered during tracing of the instrumented program.

8. The method of claim 1, wherein the property file is associated with a tracing framework driver.

9. The method of claim 7, wherein the property file is processed when the tracing framework driver file is loaded into the system.

10. The method of claim 1, wherein information obtained during tracing associated with the anonymous consumer state is stored in a kernel-level buffer.

11. An apparatus for tracing an instrumented program on a system, comprising:
 a processor configured to, while the system is rebooting:
  process a property file to enable a tracing framework, wherein enabling the tracing framework comprises creating an anonymous consumer state, and
  execute the tracing framework, wherein the tracing framework is configured to support the anonymous consumer state and configured to trace the instrumented program using the anonymous consumer state; and
 a memory configured to store the property file after the system has booted, wherein the property file is configured to store an object code defining enabling information to create the anonymous consumer state, and wherein the system is rebooted after the property file is stored,
 wherein the system is unable to execute a user-level program while rebooting.

12. The apparatus of claim 11, wherein the processor is further configured to execute a consumer, wherein the consumer is configured to claim the anonymous consumer state after the system has completed rebooting.

13. The apparatus of claim 12, wherein the anonymous consumer state is converted to a consumer state after the anonymous consumer state is claimed by the consumer.

14. The apparatus of claim 12, wherein claiming the anonymous consumer state comprises associating the anonymous consumer state with the consumer.

15. The apparatus of claim 14, wherein the consumer can access the information obtained during tracing associated with the anonymous consumer state, after the anonymous consumer state is associated with the consumer.

16. The apparatus of claim 11, wherein the processor is further configured to:
 execute a tracing framework driver associated with the property file, wherein the tracing framework driver configured to instantiate the tracing framework; and
 execute a kernel, wherein the kernel is configured to load the tracing framework driver and configured to process the property file to enable to the tracing framework.

17. The apparatus of claim 13, wherein the kernel is configured to load the property file as soon as possible after the kernel is loaded.

18. The apparatus of claim 11, wherein the enabling information defines a probe to enable and an action to perform when the probe is encountered during tracing of the instrumented program.

19. The apparatus of claim 11, wherein the object code is generated using tracing operation source code.

20. A network system having a plurality of nodes, wherein each of the plurality of nodes comprises a processor and a memory, comprising:

a tracing framework configured to, while at least one of the plurality of nodes is rebooting:
  support an anonymous consumer state, wherein the anonymous consumer state is created when the tracing framework is enabled, and
  trace the instrumented program using the anonymous consumer state; and
 a property file configured to store an object code defining enabling information to create the anonymous consumer state after the at least one of the plurality of nodes has booted, wherein the at least one of the plurality of nodes is rebooted after the property file is stored,
 wherein the at least one of the plurality of nodes is unable to execute a user-level program while rebooting,
 wherein the tracing framework resides on any one of the plurality of nodes, and
 wherein the property file resides on any one of the plurality of nodes.

21. The network system of claim 20, further comprising:
 a consumer configured to claim the anonymous consumer state after the at least one of the plurality of nodes has completed rebooting,
 wherein the property file resides on any one of the plurality of nodes.

22. The network system of claim 20, further comprising:
 a tracing framework driver associated with the property file configured to instantiate the tracing framework; and
 a kernel configured to load the tracing framework driver and configured to process the property file to enable to the tracing framework.

23. A computer system configured to tracing an instrumented program on a system during booting, comprising:
 a first processor;
 a memory;
 a storage device; and
 software instructions stored in the memory for enabling the computer system to:
 boot the system;
 load, after the system has booted, object code defining enabling information into a property file associated with a tracing framework; and
 reboot the system after the object code is loaded;
 wherein while the system is rebooting:
  the property file is processed to enable the tracing framework, wherein enabling the tracing framework comprises creating an anonymous consumer state; and
  the instrumented program is traced using the enabled tracing framework, and
 wherein the system is unable to execute a user-level program while rebooting.

24. The computer system of claim 23, further comprising:
 software instructions stored in the memory for enabling the computer system to:
 associate the anonymous consumer state with a consumer after the system has completed rebooting.

25. The computer system of claim 23, further comprising:
 defining a tracing operation source code; and
 generating the object code using the tracing operation source code.

* * * * *